United States Patent
Kuolt et al.

(10) Patent No.: US 9,770,830 B2
(45) Date of Patent: Sep. 26, 2017

(54) VACUUM GENERATING APPARATUS AND VACUUM TUBE LIFTER HAVING A VACUUM GENERATING APPARATUS

(71) Applicant: J. Schmalz GmbH, Glatten (DE)

(72) Inventors: Harald Kuolt, Deilingen (DE); Jan Gauss, Seewald (DE)

(73) Assignee: J. Schmaiz GmbH, Glatten (DE)

( * ) Notice: Subject to any disclaimer, the term of this patent is extended or adjusted under 35 U.S.C. 154(b) by 0 days.

(21) Appl. No.: 15/041,760

(22) Filed: Feb. 11, 2016

(65) Prior Publication Data

US 2016/0271805 A1    Sep. 22, 2016

(30) Foreign Application Priority Data

Feb. 12, 2015   (DE) .................. 10 2015 202 603

(51) Int. Cl.
| | |
|---|---|
| A47J 45/00 | (2006.01) |
| B25J 15/06 | (2006.01) |
| F04F 5/52 | (2006.01) |
| F04D 25/06 | (2006.01) |
| F04D 25/16 | (2006.01) |
| F04D 29/28 | (2006.01) |

(52) U.S. Cl.
CPC .......... B25J 15/0675 (2013.01); F04D 25/06 (2013.01); F04D 25/16 (2013.01); F04D 29/281 (2013.01); F04F 5/52 (2013.01)

(58) Field of Classification Search
CPC ................ B25J 15/0616; B25J 15/0625; B25J 15/0691; B25J 15/0675; H01L 21/6838; B66C 1/02; B25B 11/007; B65G 47/91; F04F 5/52; F04D 25/06; F04D 25/16; F04D 29/281

USPC ......................................................... 294/183
See application file for complete search history.

(56) References Cited

U.S. PATENT DOCUMENTS

| | | | |
|---|---|---|---|
| 3,369,735 A | 2/1968 | Hoffmeister | |
| 4,315,717 A | 2/1982 | King | |
| 5,277,468 A | 1/1994 | Blatt et al. | |
| 5,431,469 A | 7/1995 | Ohno et al. | |

(Continued)

FOREIGN PATENT DOCUMENTS

| | | |
|---|---|---|
| DE | 1503706 | 7/1970 |
| DE | 9208045.6 | 8/1992 |

(Continued)

OTHER PUBLICATIONS

DE9208045.6 Abstract not available.
Abstract available for DE1503706, see abstract for corresponding U.S. Pat. No. 3,369,735.
Abstract available for DE69717426, see abstract for corresponding WO9736818.

(Continued)

*Primary Examiner* — Stephen Vu
(74) *Attorney, Agent, or Firm* — Ware, Fressola, Maguire & Barber, LLP

(57) ABSTRACT

The invention involves a vacuum generator apparatus with an electrically driven primary vacuum generator with a suction connection for sucking in a primary suction flow, and with at least one ejector apparatus, which has an inflow opening open to the environment, an outflow opening, and a suction opening that can be streamed through by a suction stream created at the suction opening from the inflow opening to the outflow opening, whereby the suction connection of the electrically driven primary vacuum generator is connected by flow with the outflow opening of the ejector apparatus.

20 Claims, 6 Drawing Sheets

(56) References Cited

U.S. PATENT DOCUMENTS

| | | | |
|---|---|---|---|
| 6,729,852 B2* | 5/2004 | Schnatterer | F04F 5/52 417/151 |
| 2002/0033611 A1 | 3/2002 | Schmalz et al. | |
| 2002/0144739 A1* | 10/2002 | Schnatterer | F04F 5/20 137/832 |
| 2009/0269240 A1* | 10/2009 | Tanaka | C01B 13/11 422/24 |
| 2012/0256433 A1* | 10/2012 | Fukano | B25B 11/007 294/183 |
| 2013/0129464 A1* | 5/2013 | Regan | B25J 15/0691 414/800 |
| 2014/0263578 A1* | 9/2014 | Youngquist | H05K 13/0408 228/103 |

FOREIGN PATENT DOCUMENTS

| | | |
|---|---|---|
| DE | 10046539 | 4/2002 |
| DE | 10119938 | 11/2002 |
| DE | 69717426 | 7/2003 |
| WO | 9736818 | 10/1997 |
| WO | 20112898 | 2/2001 |

OTHER PUBLICATIONS

Abstract available for DE10046539, see abstract for corresponding US2002033611.
DE10119938 English Language Abstract (1 page).

* cited by examiner

VACUUM GENERATING APPARATUS AND VACUUM TUBE LIFTER HAVING A VACUUM GENERATING APPARATUS

CROSS-REFERENCE TO RELATED APPLICATIONS

This application claims benefit to German patent application serial no. 10 2015 202 603.5, filed 12 Feb. 2015, which is incorporated by reference in their entirety.

BACKGROUND OF THE INVENTION

1. Field of Invention

The invention relates to a vacuum generating apparatus with an electrically driven primary vacuum generator, and a vacuum tube lifter with such a vacuum generating apparatus.

2. Description of Related Art

These vacuum generating apparatuses are used particularly when larger flow volumes of suctioned in air must be evacuated. One example is the handling of objects with what are called vacuum tube lifters. These permit handling in a way that the object to be gripped is held by a gripping device located on a lifting tube, and the lifting tube is shortened by the vacuum that is applied to it. Large volumes must therefore be regularly evacuated from the lifting tube. At the same time it is desirable to provide a sufficiently strong vacuum for the vacuum gripping device of the vacuum tube lifter to assure a firm hold on the object. Vacuum generating apparatuses with electrically driven vacuum generators are also used in systems in which no pneumatic infrastructure, such as a supply of compressed air, is available.

In electrically driven vacuum generators, the vacuum pressure as a rule can be improved only by providing higher RPMs (such as through vacuum pumps) or improved insulation of blower wheels. Such measures are often technically complex and expensive.

On the other hand, items that are called ejectors are known, which are driven with compressed air and which generate a vacuum according to the jet suction pump principle. Ordinarily, an ejector has an ejector nozzle with an inflow opening for the driving compressed air and a capture nozzle with an outflow opening following in the flow path. Between the ejector nozzle and the capture nozzle a vacuum opening is provided, at which a vacuum can be tapped based on a flow from the ejector nozzle to the capture nozzle. To improve the vacuum that is created, what are called multi-stage ejectors are known, in which several ejectors are connected in series such that the exhaust coming out of the capture nozzle of the first ejector acts as propellant gas for feeding the ejector nozzle of the next ejector in line. EP 1 212 485 A2 shows another type of ejector interconnection. In this case, two ejectors are compactly braced in one housing in a vacuum generating apparatus. A connecting channel is configured in the housing, creating an internal flow connection from the suction connection of the one ejector to the outflow opening on the capture nozzle of the ejector downstream. To the extent that there are several ejector nozzles and capture nozzles of this type combined in one housing, as a result a higher energy efficiency and/or an improved vacuum level can be achieved in comparison with that of a standard ejector. The total apparatus is driven with pressurized fluid.

SUMMARY OF THE INVENTION

The task of the invention consists in improving the achievable vacuum level and increasing the energy efficiency of vacuum handling devices that have an electric primary drive by means of a simple and cost-effective configuration. In addition, comparatively high flow volumes for the suctioned off air should be able to be achieved.

This task is solved by a vacuum generating apparatus that has an electrically actively driven primary vacuum generator having a suction connection for suctioning off a primary suction flow. In addition, at least one ejector apparatus is provided, which has an inflow opening which is open to the environment, an outflow opening, and a suction opening, and in which a suction effect can be created at the suction opening by use of the jet suction pump principle. For this purpose, the ejector apparatus has a suction flow flowing through it from the inflow opening to the outflow opening. The suction connection of the electrically driven primary vacuum generator is thereby in flow connection with the outflow opening of the ejector apparatus such that the suctioning off flow through the ejector apparatus is driven by the suctioning in of the primary flow.

The primary vacuum generator is a vacuum generator not driven pneumatically, preferentially an electrically driven vacuum pump, a vacuum blower, or a compressor. Such pieces of apparatus are as a rule distinguished by the fact that a comparatively large flow volume can be tapped as the primary suction flow at the suction connection.

The suction opening of the at least one ejector apparatus is then connected to a user connection of the vacuum generating apparatus, provided for connection, for example, to a vacuum handling apparatus or a vacuum clamping apparatus.

The ejector apparatus can have a simple configuration and preferentially comprises an ejector nozzle with an assigned inflow opening, and a capture nozzle following in the stream flow, into which the suctioning off flow that is flowing out of the ejector nozzle flows, and finally leaves the ejector through the outflow opening. The suctioning off flow creates a vacuum at the suction opening provided between the ejector nozzle and the capture nozzle.

In this way it is not necessary to actively drive the suctioning off flow by pressure supplied at the inflow opening. Rather, the inflow opening is open to the environment and is therefore acted on by atmospheric pressure. It has turned out that suctioning at the outflow opening leads to a situation where an improved vacuum level as opposed to the primary vacuum can be generated at the suction opening of the ejector apparatus. This is accomplished with high energy efficiency, and the comparatively high volume flow that is achievable with the primary vacuum generator remains usable. Conversely, a desired low vacuum level can be achieved using technically less complex and in some cases smaller primary vacuum generators.

Due to the high volume flow that can be provided by the primary vacuum generator, a plurality of ejector apparatuses can be connected in parallel to further improve the vacuum level. Each of the ejector apparatuses has an inflow opening, an outflow opening, and a suction opening, and can be connected in parallel by connecting their suction openings to a common user connection of the vacuum generating apparatus. During the operation of the apparatus, the improved vacuum can be tapped at the user connection. In particular, the individual outflow openings are also connected together to the suction connection of the primary vacuum generator. For this, the outflow openings can be brought together in a main line that is connected to the vacuum generator.

The primary vacuum generator and the ejector apparatus are preferentially not set up in a common housing, and are instead arranged separately and if necessary connected to one another through vacuum hoses. In particular, the vacuum generator and the ejector apparatus are structured as separate, for example modular components, and the suction connection is connected to the outflow opening of the ejector apparatus by means of a vacuum hose. The outflow opening can then be connected to a connection of a vacuum handling apparatus or vacuum clamping apparatus. The described embodiment allows the ejector apparatus to be placed close to the vacuum handling apparatus or on the vacuum handling apparatus itself. Thereby, during operation of the apparatus, only the primary flow streams through the vacuum hose, and only the vacuum level of the primary vacuum generator is present in the vacuum hose. Only in places where an actually higher vacuum is required (meaning a lower pressure), thus close to the vacuum handling apparatus, is the vacuum level that has been improved by the ejector apparatus present. The system as a whole, and in particular the vacuum hoses, must therefore meet only less stringent requirements for insulation and quality of material. Losses through leakage can be minimized as well, and the lifetime of the system can be lengthened.

According to a preferred embodiment, the ejector apparatus can be integrated into a connection element of a vacuum handling apparatus, for example, in the connection nipple of a suction gripper. Several such units can be connected to the common primary vacuum generator.

It is also conceivable for the ejector apparatus to be embodied as a type of interposed adapter. To this end, the ejector apparatus can be installed in an adapter housing, which is constructed as a capsule or as essentially cylindrical, for example. The adapter housing preferentially has a primary suction connection on one side, for connection to the primary vacuum generator, and a user connection on the opposite side for tapping the usable vacuum. Between the primary suction connection and the user connection a main suction channel extends preferentially axially in the adapter housing, with several ejector apparatuses of the described type being arranged around the main suction channel in the adapter housing. Each outflow opening is connected to the primary suction connection or feeds into the main suction channel. The suction openings feed into the user connection of the adapter housing. The primary suction connection and the user connection of the adapter housing can be formed by connecting ports arranged opposite each other. Such an adapter housing can then be intermediately connected in the form of an interposed adapter in a hose connection between the vacuum generator and a handling apparatus. In this way it is possible to easily upgrade an existing vacuum handling unit to an improved vacuum level by intermediately connecting the adapter housing. The inflow openings of the ejectors, which openings are open to the environment, can be arranged in the adapter housing in dispersed fashion around the user connection, for example.

In another embodiment, it is advantageous if the flow connection through the central main suction channel can be closed off by a valve apparatus (e.g., a back pressure valve). The valve apparatus is tripped in particular as a function of the pressure. For example, it can close off the direct throughflow from the primary suction channel to the user connection when the pressure drops below a target vacuum in the area of the user connection, so that the improved vacuum is provided only by the ejector apparatuses.

Regardless of the specific embodiment, a back pressure valve can be provided for the suction opening of the ejector apparatus. Said valve is particularly situated upstream in relation to a suctioned-in flow. In its closed position, the back pressure valve closes the suction opening and prevents further suctioning in. This allows the primary vacuum generator to be switched off or ramped down, for example, once a target vacuum is achieved for the purpose of saving energy. This is useful, for example, when a suction gripping device driven by the vacuum generating apparatus is resting on a workpiece forming a tight seal and the standing vacuum remains stable. The back pressure valve then prevents the standing vacuum from winding down as a result of air flowing back through the ejector.

In another embodiment, a pressure sensor can be provided on the user connection side, that is, on the side of the back pressure valve that faces away from the ejector apparatus. With this, the built-up vacuum can be monitored. In particular, the pressure sensor is connected to a control device for the primary vacuum generator, which controls the vacuum generator based on the measured pressure data. In particular, the vacuum generator is activated whenever the measured pressure climbs above a critical value and therefore the vacuum must be refreshed.

In principle, it is conceivable for the inflow opening to be closed once the target vacuum is reached. The suction flow of the ejector coming from the outflow opening can thereby be prevented from unnecessarily putting additional strain on the primary vacuum generator even after a target vacuum has been reached. For this purpose, it is conceivable for an adjustable valve to be assigned to the inflow opening that is open to the environment, in particular connected upstream with respect to the inflow. For example, the valve can be embodied such that when it is closed it closes off the inflow opening and prevents inflow into the inflow opening.

In another embodiment, a pressure sensor for measuring the vacuum at the suction opening of the ejector apparatus can be provided, with the controllable valve allocated to the inflow opening being controllable based on the measured values of the vacuum. In particular, that the control involves closing the valve when the pressure drops below a target vacuum. In this way, unnecessary strain on the primary vacuum generator by environmental air that is suctioned in is avoided.

A bypass to the flow connection of the suction connection with the user connection is preferentially provided such that the ejector apparatus can be bypassed. The bypass preferentially feeds on one side into a connection between the outflow opening of the ejector apparatus and the suction connection of the primary vacuum generator, and on the other side flows into a connection between the suction opening of the ejector apparatus and the user connection. By means of the bypass, when necessary, large flow volumes can be suctioned up with the primary vacuum generator directly from the user connection. In order to close the bypass as needed, a valve apparatus is preferentially provided in the bypass. The valve apparatus can assume a closed position in which flow through the bypass is stopped.

The valve apparatus can be embodied, for example, as a back pressure valve. Also advantageous is an embodiment as a controllable valve, which is controlled depending measured vacuum values for the vacuum present at the user connection. For this, a pressure sensor for measuring the vacuum that is present at the user connection may be provided. The pressure sensor can measure the pressure in the user connection or in a vacuum hose that leads to the user connection, for example.

The flow volume through standard ejectors is often dependent on their construction. With a suitable arrangement, the effect of several ejectors can be combined in a compact manner by using a parallel connection. For this purpose, several ejector apparatuses (each one with an inflow opening, a suction opening, and an outflow opening) can be arranged in a common ejector console, which has a suctioning off channel extending in the ejector console (e.g., in a straight line). The suctioning off channel feeds into a primary connection for connection to the primary vacuum generator. The ejector apparatuses are arranged along the suctioning off channel such that the outflow openings successively feed into these along the suction channel. In particular, the ejector apparatuses can be embodied as a rod-like ejector cartridges having terminal outflow openings, with the ejector console having a plurality of receiving sockets for these ejector cartridges, extending side by side and preferably feeding perpendicular into the suctioning off channel. In addition, a main channel into which the suction openings of the ejector cartridges feed preferably also runs in the ejector console. The main channel can then feed into a user connection of the ejector console, via which the connection to a vacuum handling apparatus can be established, for example.

The described vacuum generating apparatuses achieve the objected stated in the introductory part in a particularly advantageous way in what is called a vacuum tube lifter. This involves a vacuum lifting device as known, for example, from DE 92 08 045 U1. Vacuum tube lifters are used for handling, for example for gripping, lifting, and moving objects, and have a lifting tube which can be shortened by a vacuum that is present therein. The object that is picked up is suctioned by means of a suction gripper. Handling of the object is supported by the shortening of the lifting tube induced by the vacuum. Such a vacuum tube lifter is preferentially outfitted with a vacuum generating apparatus of the described type.

The evacuation of the lifting tube, preferentially by means of the primary vacuum generator, thereby results. In this process large flow volumes can occur, and in principle can be exhausted in an advantageous manner by the primary vacuum generator. The primary vacuum generator can be arranged, for example, in the area of the end of the lifting tube that faces away from the vacuum gripping device, for example on a bearing structure of the vacuum tube lifter. The ejector apparatus can be arranged, for example, in the area of the vacuum gripping device or on the vacuum gripping device itself. Thus the vacuum is first increased at a place where it is required for holding the object. The holding power of this vacuum tube lifter is thereby increased and the security of the hold is improved. The advantages according to the invention, in particular the combination of a highly useful volume flow and an increased vacuum level, are therefore utilized in an especially advantageous manner when the vacuum generating apparatus is used in a vacuum tube lifter.

BRIEF DESCRIPTION OF THE DRAWING

The present invention will be further described below on the basis of a drawing having FIGS. 1-7, as follows.

In the following description and in the figures, the same reference numbers are used for identical or corresponding features in each case.

DETAILED DESCRIPTION OF THE BEST MODE OF THE INVENTION

Figure 1:
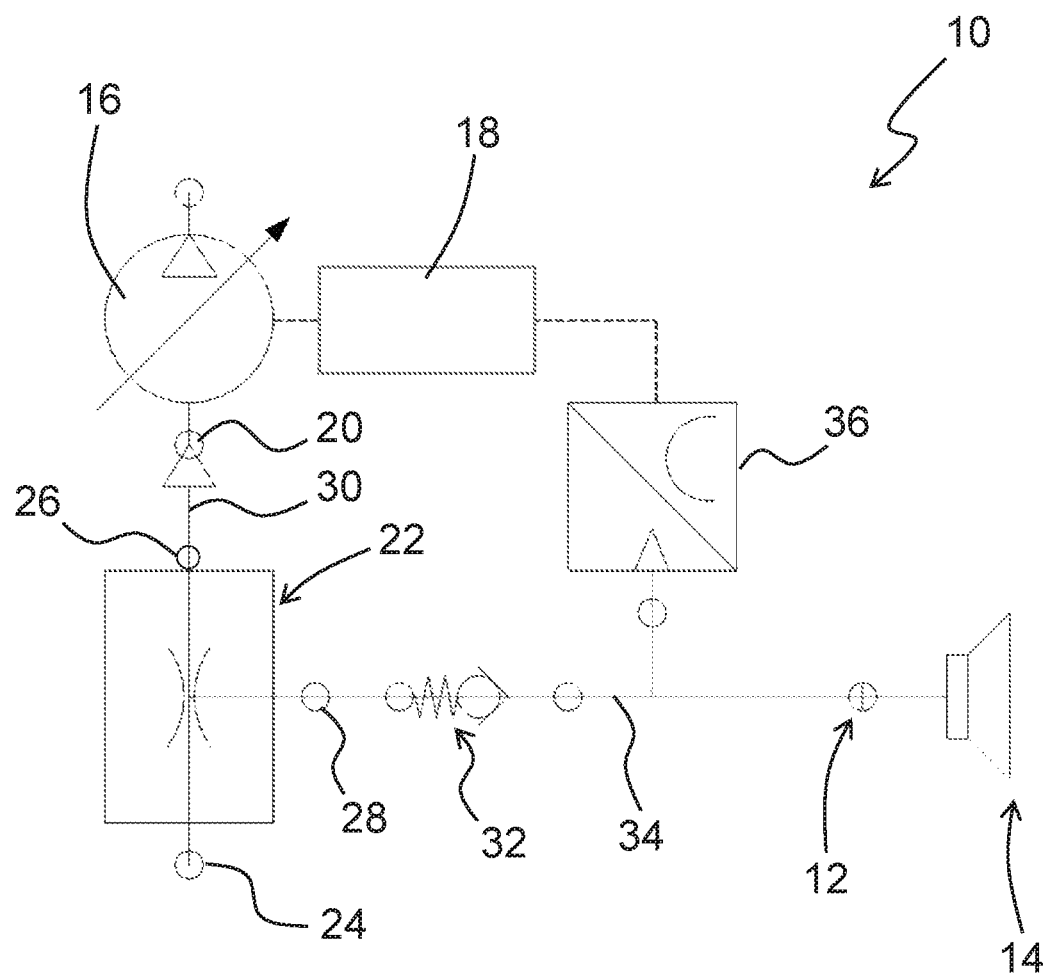
FIG. 1 is a connection diagram of a first embodiment of a vacuum generating apparatus.

FIG. 1 schematically shows a connection diagram of a vacuum generating apparatus 10, which is connected via its user connection 12 to a vacuum handling device (here the suction gripper 14) which it supplies with a vacuum. A primary vacuum generator 16 in the illustrated example is embodied as an electrically driven vacuum pump. For controlling the primary vacuum generator, a control device 18 can be provided, by means of which, for example, the rotational speed of the vacuum generator 16 and/or its activation or deactivation can be controlled.

The vacuum generator 16 has a suction connection 20 through which a primary suction flow can be suctioned up. The primary suction flow drives an ejector apparatus 22. This has an inflow opening 24 and an outflow opening 26. The outflow opening 26 is open to the environment to the extent that environmental air can flow through said opening into the ejector 22 (unless a controlled closure takes place, see below). The ejector apparatus 22 also has a suction opening 28, in which a vacuum can be provided according to the suction jet pump principle by means of a suction flow that forms from the inflow opening 24 to the outflow opening 26. The suction flow is driven by the primary vacuum generator 16 applying suction to the outflow opening 26 of the ejector apparatus, thereby suctioning air in from the environment through the inflow opening 24 into the ejector apparatus 22.

Basically, the primary vacuum generator 16 and the ejector device 22 can be embodied as separate components that are spaced from one another. The connection between the suction connection 20 and the outflow opening 26 can then be made using a vacuum hose 30. However this embodiment is however not imperative.

A back pressure valve 32 is allocated to the suction opening 28 of the ejector apparatus 22. In the example presented, said valve is connected in intermediate fashion in a vacuum hose 34, which connects the suction opening 28 to the user connection 12 or to the vacuum handling device 14. In its closed position, the back pressure valve interrupts the flow connection between the suction opening 28 and the user connection 12 or the vacuum handling apparatus 14. In particular, the back pressure valve 32 adopts its closed position if a sufficiently high vacuum is present on the side of the user connection 12 for the suction gripper 14 to be operated safely. In this case, in order to save energy, the primary vacuum generator 16 can be deactivated or at least ramped down. The control device 18 in particular is connected here to a pressure sensor 36, which measures the prevailing vacuum in the user connection 12, or in the example that is presented, in the vacuum hose 34. The control device 18 controls the vacuum generator 16 preferentially based on the measured pressure values.

Figure 2A:
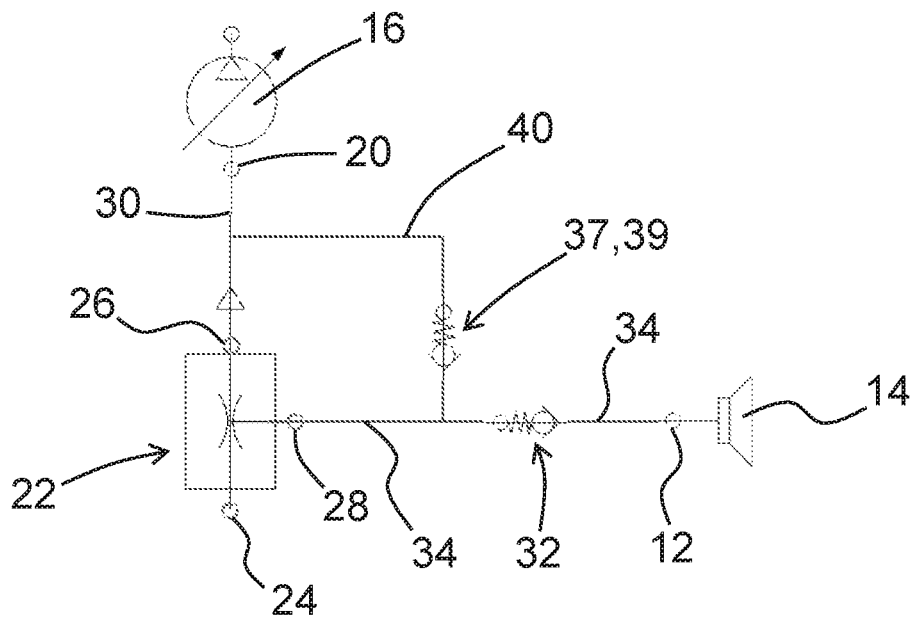
FIGS. 2a and 2b are connection diagrams of other embodiments of the vacuum generating apparatus.
Figure 2B:
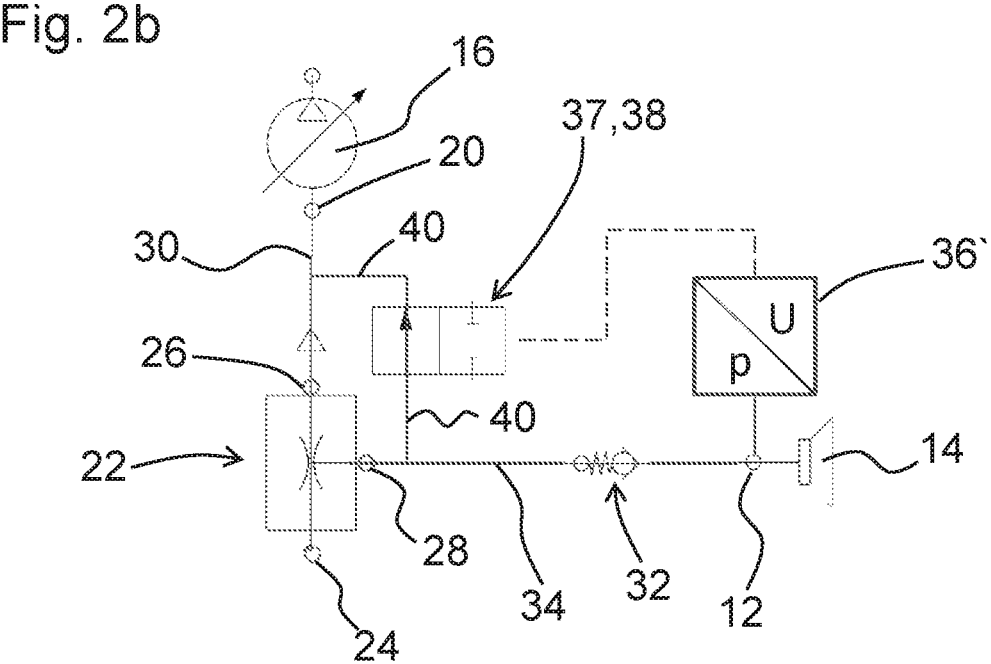

FIGS. 2a and 2b show other embodiments as a connection diagram. In these, a bypass 40 is provided, with which the ejector apparatus 22 can be bypassed. The bypass 40 is set up such that a flow connection between the suction connection 20 and the user connection 12 can be created by detouring around the ejector device 22. In the example presented, the bypass 40 feeds on one side into the vacuum hose 30 between the suction connection 20 and the outflow opening 26, and on the other side feeds into the vacuum hose 34 between the user connection 12 and the suction opening 28.

In order to close the bypass 40, a valve apparatus 37 is preferentially provided in the bypass 40. If this valve apparatus adopts a closed position, a flow through the bypass 40 is prevented. If the valve apparatus 37 adopts an open position, then the primary vacuum generator 16 can suction directly from the user connection 12. Preferentially the bypass 40 will open whenever high flow volumes are to be suctioned through the user connection 12 and comparatively low demands are placed on the achieved vacuum level. This may be desired, for example, at the beginning of a suction procedure to grip a workpiece with the vacuum handling device 14.

As shown in FIG. 2a, the valve apparatus 37 can be embodied as a back pressure valve 39. This is preferentially pre-loaded in the direction of a closed position.

From a user connection side, in particular between the feed of the bypass 40 into the vacuum hose 34 and the user connection 12, optionally again a back pressure valve 32 may be provided, which in its closed position interrupts the flow connection to the user connection 12 or to the vacuum handling apparatus 14 (cf. FIG. 1). In particular the back pressure valve 32 adopts its closed position if a sufficiently high vacuum is present on the sides of the user connection 12.

As shown in FIG. 2b, the valve apparatus 37 can be embodied as controllable valve 38. In order to control the valve 38 based on the pressure at the user connection 12, a pressure sensor 36' measures the user side vacuum. The pressure sensor 36' is connected to the controllable valve 38 via a connection hose, and controls the controllable valve 38. For example, the pressure sensor 36' may be embodied as a differential pressure gauge, which can be moved at a threshold value for the vacuum into a switch position that causes the closing of the valve 38.

In FIGS. 3 to 6, various embodiments for the ejector apparatus 22 are shown. With regard to other components, such as the primary vacuum generator or valves and sensors, etc., reference is made to FIGS. 1 and 2.

Figure 3:
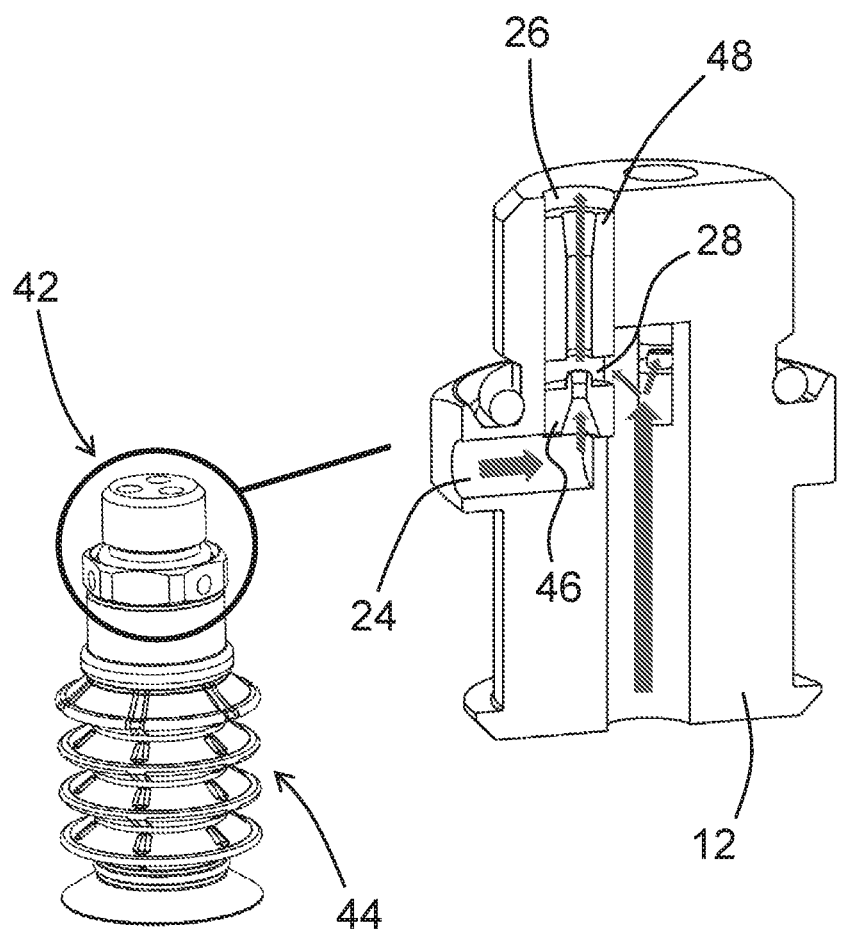
FIG. 3 shows an example of an integration of an ejector apparatus into a connection nipple.

In FIG. 3, the ejector device 22 is integrated into a connection nipple 42 of a bellows suction cup 44. As seen in the sectional view, the inflow opening 24 feeds into an area lying radially to the outside of the connection nipple 42 in the environment. The inflow opening 24 extends to a jet nozzle 46 provided in the connection nipple 42, in which the inflowing air is accelerated. The suction stream thus generated is taken up by a capture nozzle 48, which feeds into the outflow opening 26 of the connection nipple 42. The connection to the primary vacuum generator can then be connected at the outflow opening 26. A suction opening provided between the jet nozzle 46 and the capture nozzle 48 is connected to a central bore hole of the connection nipple 42, which forms the user connection 12 and feeds into the bellows suction cup 44. For this, the axial bore hole of the connection nipple 42 that provides the user attachment 12 has a radial breakthrough to the suction opening 28. In principle, it is possible to provide several ejector apparatuses (that is, combinations of jet nozzles 46 and capture nozzles 48) around the central bore hole (user connection 12) in the connection nipple 42.

Figure 4:
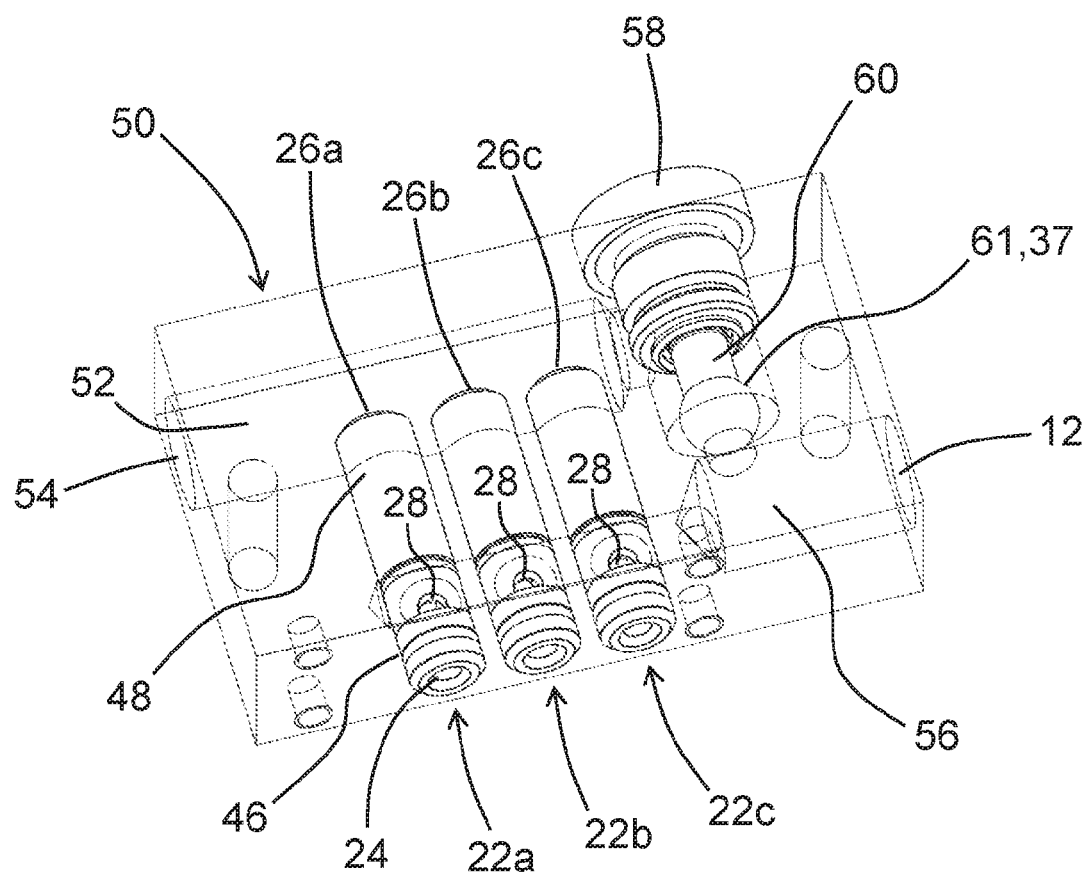
FIG. 4 shows an ejector console with a plurality of integrated ejector apparatuses.

FIG. 4 shows the parallel connection of several ejector apparatus devices 22a, 22b, 22c in a joint ejector console 50. A suction channel 52 extends within the ejector console 50, and feeds into a primary connection 54 of the console. The console 50 can be connected via said channel to a primary vacuum generator 16 (cf. FIGS. 1 and 2). Along the extension of the suction channel 52, the outflow openings 26a, 26b, 26c of the ejector apparatuses feed sequentially into the suction channel 52. As shown in the presented example, for this purpose several receiving sockets which feed sequentially into the suction channel 52 along the extension thereof can be provided in the ejector console 50. In the example that is given, cartridge-like ejectors are attached, each with a jet nozzle 46 (having the particular inflow opening 34) and capture nozzle 48 (having the particular outflow opening 26). The suction openings 28 of the various ejectors are connected with each other via a main channel 56 running in the ejector console 50 and feed into the user connection 12. In the given example, the ejector console 50 also has a pressure tap 58, at which for example a vacuum measurement can take place, or through which a blowoff impulse can be supplied to the ejector apparatuses. In addition, a bypass channel 60 is formed in the ejector console 50, which forms a bypass 40. The bypass channel 60 connects the suction channel 52 to the main channel 56, and thereby allows bridging over the ejector apparatuses 22a to 22c. In order to close the bypass channel 60, a back pressure valve 61 (valve apparatus 37) is provided in it. In particular, the bypass channel 60 is opened whenever high flow volumes are to be suctioned through the user connection 12 and only comparatively low demands are placed on the achieved vacuum level.

Figure 5:
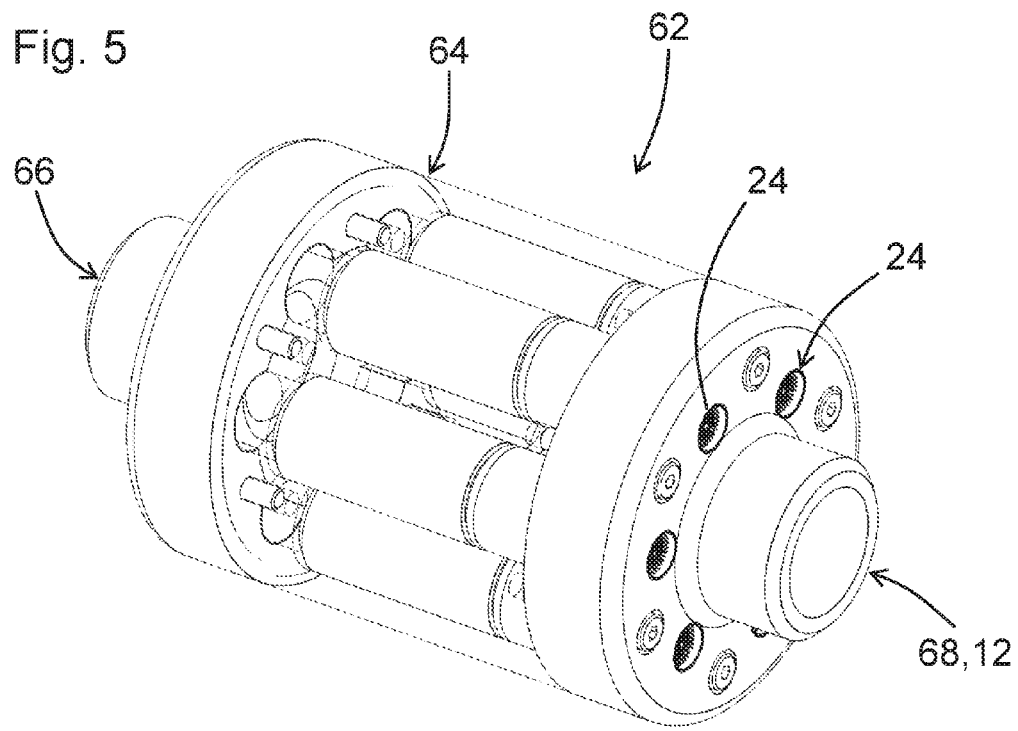
FIG. 5 shows an example of an ejector apparatus embodied as an interposed adapter.
Figure 6:
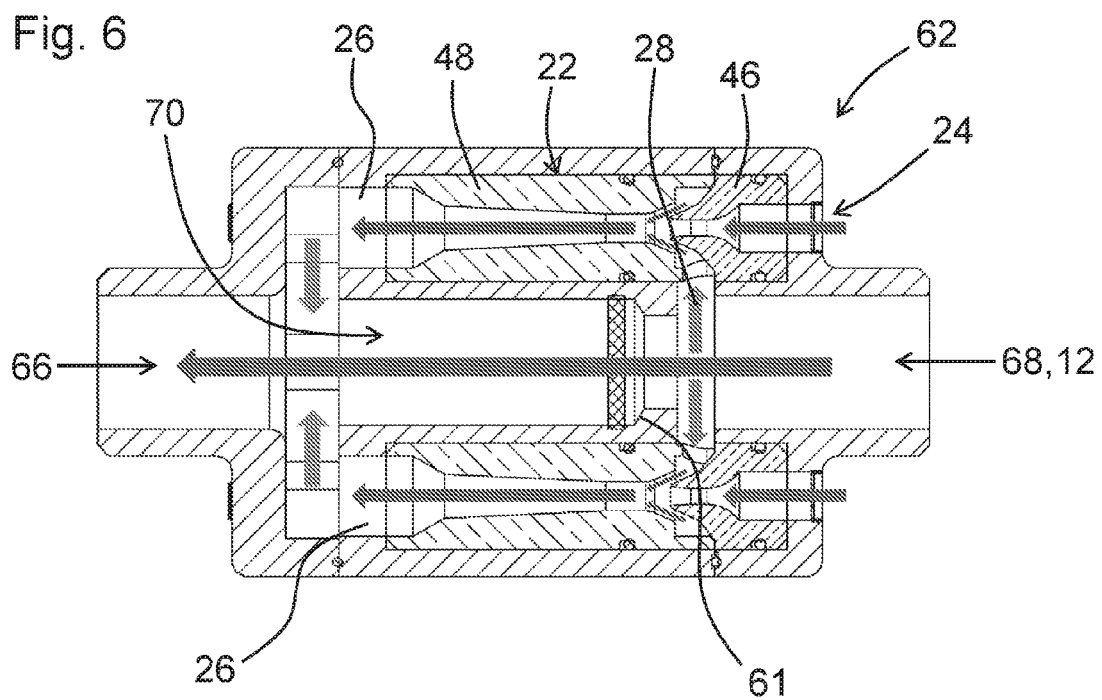
FIG. 6 shows a longitudinal sectional illustration of that shown in FIG. 5.

In reference to FIGS. 5 and 6, an ejector apparatus 22 in the form of an interposed adapter 62 will be described. This has an adapter housing 64, which in the example that is presented is formed like a capsule with an essentially cylindrical form. The adapter housing 64 has a connection port 66 (primary suction connection) for connection to the primary vacuum generator 16 and an axially opposite connection port 68 (user connection 12).

An axial main suction channel 70 runs through the adapter housing 64 between the primary suction connection 66 and the user connection 68. The direct connection between the primary suction connection 66 and the user connection 68 is again closable by means of a back pressure valve 61. Several ejector devices 22 are arranged distributed around the main suction channel 70. These once again have a jet nozzle 46 with an inflow opening 24 that is open to the environment. In the example that is given, the inflow openings 24 of the various ejector apparatuses 22 are arranged distributed around the user connection 68 (or 12). Downstream of the jet nozzle, a capture nozzle 48 is again provided, the outflow opening 26 of which feeds into the main suction channel 70 in the area of the primary suction connection 66. The suction opening 28 of the ejector apparatus 22 provided between the jet nozzle 46 and the capture nozzle 48 feeds into the main suction channel 70 in the area of the user connection 68 or 12. The backflow valve 61 is situated in the main suction channel 70 in such a way that when the vacuum level in the user connection 68 is sufficient, the direct flow connection to the primary suction connection 66 through the main suction channel 70 is interrupted, and suctioning occurs only through the suction openings 28 of the ejector apparatuses 22.

Figure 7:
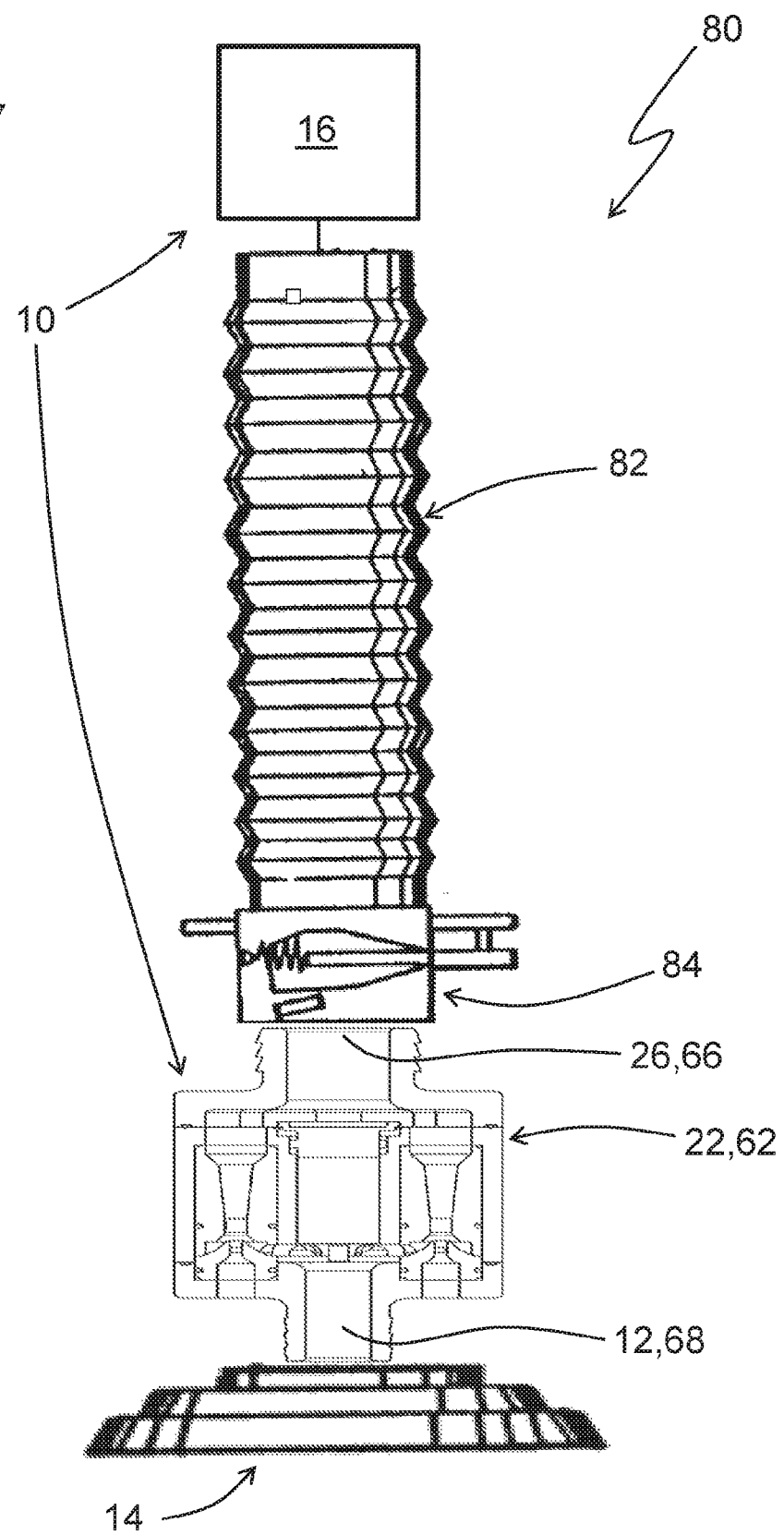
FIG. 7 shows an outline diagram illustrating a vacuum tube lifter according to the present invention.

FIG. 7 shows a sketch of a vacuum tube lifter 80, which is outfitted with a vacuum generating apparatus 10 according to the invention. In the example that is presented, the vacuum generating apparatus 10 comprises a primary vacuum generator 16 (e.g., electrically driven vacuum pump) and an ejector apparatus 22, which is embodied as an interposed adapter 62 (cf. FIG. 5).

The vacuum tube lifter 80 comprises a lifting tube 82 with a vacuum gripping device 14 located at its free end (here: suction gripper). The lifting tube 82 can be shortened in a controlled manner by applying a vacuum, to enable an object that is gripped with the vacuum gripping device 14 to be lifted in a controlled manner. The lifting tube 82 can be again lengthened by aeration (putting the object down). For the controlled shortening and aeration of the lifting tube 82, a control device 84 is provided, which is only outlined in FIG. 7 and may comprise corresponding control valves and/or air bleeding valves. In the example that is shown, the lifting tube 82 is evacuated essentially with the primary vacuum generator 16. This can be provided, for example, on the end of the lifting tube 82 that faces away from the gripping device 14, for example on a support frame of the vacuum tube lifter 80. The ejector apparatus 22 is located in the area of the gripping device 14, and is connected with its user connection 12 to the gripping device 14. The vacuum level that has been improved by the ejector apparatus 22 is thereby available to the gripping device 14. The outflow opening 26 or the primary suction connection 66 is connected via the lifting tube 82 to the primary vacuum generator 16.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

The invention claimed is:

1. A vacuum generating apparatus (10) with an electrically driven primary vacuum generator (16) having a suction connection (20) for suctioning in a primary suction flow, and having at least one ejector apparatus (22), which has an inflow opening (24) that is open to the environment, an outflow opening (26), and a suction opening (28), and which can be streamed through by a suction stream from the inflow opening (24) to the outflow opening (26) which creates a suction effect at the suction opening (28), wherein the suction connection (20) of the electrically driven primary vacuum generator (16) is in flow connection with the outflow opening (26) of the at least one ejector apparatus (22),and wherein the at least one ejector apparatus (22) is integrated into a connection element of a vacuum handing apparatus.

2. The vacuum generating apparatus (10) according to claim 1, characterized in that several of the at least one ejector apparatus (22a-22c) are connected in parallel in such a way that respective suction openings (28) are connected to a joint user connection (12) of the vacuum generating apparatus (10).

3. The vacuum generating apparatus (10) according to claim 2, characterized in that the electrically driven primary vacuum generator (16) and the at least one ejector apparatus (22) are embodied as separate components, and the suction connection (20) is connected by a vacuum hose (30), including a vacuum tube, to the outflow opening (26) of the at least one ejector apparatus (22).

4. The vacuum generating apparatus (10) according to claim 3, characterized in that the at least one ejector apparatus (22) is integrated into a connection nipple (42) of a suction gripper (44).

5. The vacuum generating apparatus (10) according to claim 2, characterized in that an adapter housing (64) is configured to accept the at least one ejector apparatus (22), said adapter housing (64) having on one side a primary suction connection (66) for connection with the primary vacuum generator (16) and a user connection (68, 12) arranged opposite said connection, wherein a central main suction channel (70) extends between the primary suction connection (66) and the user connection (68, 12), and wherein several of the at least one ejector apparatus (22) are arranged around the central main suction channel (70), with each of the outflow openings (26) being connected to the primary suction connection (66) and each of the suction openings (28) being connected to the user connection (68, 12).

6. The vacuum generating apparatus (10) according to claim 2, characterized in that a backflow valve (32) is assigned to the suction opening (28) of the at least one ejector apparatus (22), and the backflow valve (32) in its closed position stops the suctioning into the suction opening (28).

7. The vacuum generating apparatus (10) according to claim 2, characterized in that a bypass is configured (40, 60) for a flow connection of the suction connection (20) to a user connection (12) of the vacuum generating apparatus (10) for detouring around the at least one ejector apparatus (22), wherein a valve apparatus (37; 38, 39, 61) is configured to close the bypass (40, 60).

8. The vacuum generating apparatus (10) according to claim 7, characterized in that a pressure sensor (36') is configured to measure a vacuum present at the user connection (12), and that the valve apparatus (37) is embodied as a controllable valve (38) functioning in dependence on the measured values for the vacuum.

9. The vacuum generating apparatus (10) according to claim 2, characterized in that several of the at least one ejector apparatus (22a-22c) are arranged in a joint ejector console (50), which has a suction channel (52) extending within the joint ejector console (50), which suction channel feeds into a primary connection (54) for connecting to the electrically driven primary vacuum generator (16), wherein the at least one ejector apparatus (22a-22c) are disposed along the suction channel (52) in such a way that the outflow openings (26a-26c) feed consecutively into the suction channel (52).

10. A vacuum tube lifter (80) having a lifting tube (82) and a vacuum gripping device (14) attached at one end of the lifting tube (82), and having a vacuum generating apparatus (10) according to claim 2, for supplying the vacuum gripping device (14) and/or the lifting tube (82) with a vacuum.

11. The vacuum generating apparatus (10) according to claim 1, characterized in that the electrically driven primary vacuum generator (16) and the at least one ejector apparatus (22) are embodied as separate components, and the suction connection (20) is connected by a vacuum hose (30), including a vacuum tube, to the outflow opening (26) of the at least one ejector apparatus (22).

12. The vacuum generating apparatus (10) according to claim 11, characterized in that the at least one ejector apparatus (22) is integrated into a connection nipple (42) of a suction gripper (44).

13. The vacuum generating apparatus (10) according to claim 11, characterized in that an adapter housing (64) is configured to accept the at least one ejector apparatus (22), said adapter housing (64) having on one side a primary suction connection (66) for connection with the primary vacuum generator (16) and a user connection (68, 12) arranged opposite said connection, wherein a central main suction channel (70) extends between the primary suction connection (66) and the user connection (68, 12), and wherein several of the at least one ejector apparatus (22) are arranged around the central main suction channel (70), with each of the outflow openings (26) being connected to the primary suction connection (66) and each of the suction openings (28) being connected to the user connection (68, 12).

14. The vacuum generating apparatus (10) according to claim 1, characterized in that the at least one ejector apparatus (22) is integrated into a connection nipple (42) of a suction gripper (44).

15. The vacuum generating apparatus (10) according to claim 1, characterized in that an adapter housing (64) is configured to accept the at least one ejector apparatus (22), said adapter housing (64) having on one side a primary suction connection (66) for connection with the primary vacuum generator (16) and a user connection (68, 12) arranged opposite said connection, wherein a central main suction channel (70) extends between the primary suction connection (66) and the user connection (68, 12), and wherein several of the at least one ejector apparatus (22) are arranged around the central main suction channel (70), with each of the outflow openings (26) being connected to the primary suction connection (66) and each of the suction openings (28) being connected to the user connection (68, 12).

16. The vacuum generating apparatus (10) according to claim 1, characterized in that a backflow valve (32) is assigned to the suction opening (28) of the at least one ejector apparatus (22), and the backflow valve (32) in its closed position stops the suctioning into the suction opening (28).

17. The vacuum generating apparatus (10) according to claim 1, characterized in that a bypass is configured (40, 60) for a flow connection of the suction connection (20) to a user connection (12) of the vacuum generating apparatus (10) for detouring around the at least one ejector apparatus (22), wherein a valve apparatus (37; 38, 39, 61) is configured to close the bypass (40, 60).

18. The vacuum generating apparatus (10) according to claim 17, characterized in that a pressure sensor (36') is configured to measure a vacuum present at the user connection (12), and that the valve apparatus (37) is embodied as a controllable valve (38) functioning in dependence on the measured values for the vacuum.

19. The vacuum generating apparatus (10) according to claim 1, characterized in that several of the at least one ejector apparatus (22a-22c) are arranged in a joint ejector console (50), which has a suction channel (52) extending within the joint ejector console (50), which suction channel feeds into a primary connection (54) for connecting to the electrically driven primary vacuum generator (16), wherein the at least one ejector apparatus (22a-22c) are disposed along the suction channel (52) in such a way that the outflow openings (26a-26c) feed consecutively into the suction channel (52).

20. A vacuum tube lifter (80) having a lifting tube (82) and a vacuum gripping device (14) attached at one end of the lifting tube (82), and having a vacuum generating apparatus (10) according to claim 1, for supplying the vacuum gripping device (14) and/or the lifting tube (82) with a vacuum.

\* \* \* \* \*

UNITED STATES PATENT AND TRADEMARK OFFICE
CERTIFICATE OF CORRECTION

PATENT NO. : 9,770,830 B2
APPLICATION NO. : 15/041760
DATED : September 26, 2017
INVENTOR(S) : Harald Kuolt and Jan Gauss It is certified that error appears in the above-identified patent and that said Letters Patent is hereby corrected as shown below:

On the Title Page

Assignee: "J. Schmaiz GmbH" should be --J. Schmalz GmbH--.

Signed and Sealed this
Twentieth Day of February, 2018

Andrei Iancu
*Director of the United States Patent and Trademark Office*